J. ROBINSON.
Oil-Tanks.
No. 148,850.  Patented March 24, 1874.
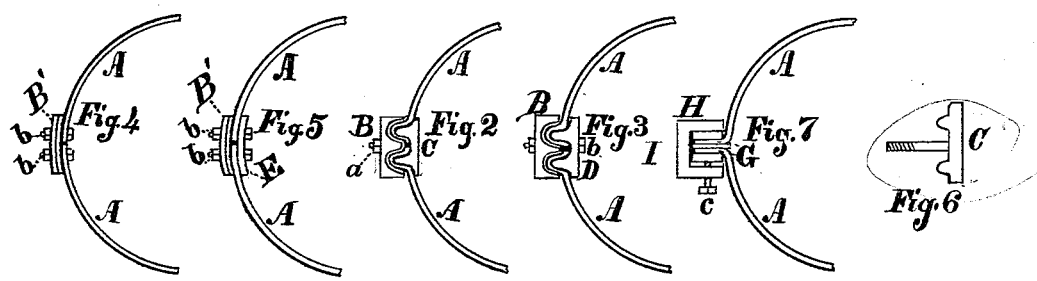
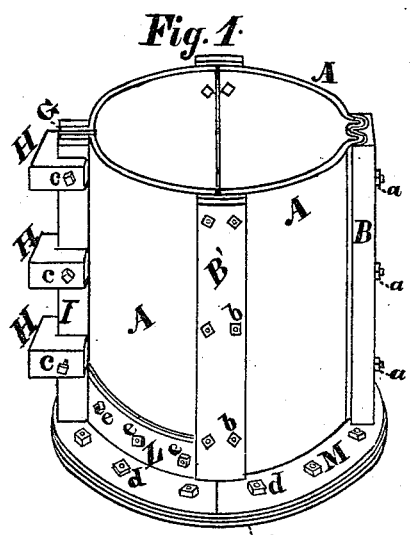
Witnesses.  Inventor:

UNITED STATES PATENT OFFICE

JAMES ROBINSON, OF ST. PETERSBURG, PENNSYLVANIA.

IMPROVEMENT IN OIL-TANKS.

Specification forming part of Letters Patent No. 148,850, dated March 24, 1874; application filed February 4, 1874.

*To all whom it may concern:*

Be it known that I, JAMES ROBINSON, of St. Petersburg, in the county of Clarion and State of Pennsylvania, have invented certain Improvements in Portable Tanks for Holding Oil or other liquids, of which the following is a specification:

The object of my invention is to construct an oil-tank in sections, bolted or clamped together in such a manner that it may be readily taken apart for removal and reset without injury, alteration, or the exercise of skilled labor. The invention consists, first, in a method of fastening the joints by bringing the plain edges of the sections together, and bolting or clamping them to a plain or grooved plate; second, in a bolt or clamp suitable for fastening the sections together, as above described; third, in a method of fastening the walls to the bottom or top of the tank by means of outwardly-turned flanges or angle-irons, forming a part of the walls or bolted to the same, and to the bottom or top of the tank.

Referring to the accompanying drawing, which forms a part of this specification, Figure 1 is a perspective view of my invention, showing the method of fastening the walls together, and the bottom to the walls of the tank. Fig. 2 is a top sectional view of the joint; Figs. 3, 4, and 5, modifications of the same; Fig. 6, a top view of the bolt or clamp; and Fig. 7, a further modification of the joint.

In Figs. 1, 2, and 3, A A are plates forming walls of the tank. In forming the joint, the plain edges of these plates are brought together opposite the corrugated strip or stay B. Between the edges of the plates A A passes the corrugated bolt C, through the corrugated strip B. Now, when the nuts *a* of the bolts C are screwed up, the corrugations of the latter press the plates A A into the grooves or depressions of the strip B, thus clamping the parts firmly together.

If preferred, the corrugations or depressions in the plates A A may be made by machinery, though the method of clamping herein described is simpler and cheaper. When found necessary, an internal corrugated strip, D, Fig. 3, may be used in conjunction with the external strip B. In this case, plain bolts *b*, passing through the strips B and D, will be sufficient.

In practice, I prefer to cut notches in the edges of the plates A A, opposite the bolts *a a*, so that the edges of said plates may be brought close together. The clamping-bolt C may be made in either one or two pieces. When in two pieces, a plain bolt passing through the clamping-head will form the clamping-bolt C, substantially as described.

When the tank is of such size that the internal pressure of the oil will not be too great, the corrugations in the strip B and clamping-bolt C may be dispensed with, a plain strip and clamping-bolt being used.

In Figs. 4 and 5, the plates A A are brought together, as already described, and held in place by the bolts *b b* passing through said plates and the strip B'. When desired, the inside strip E, Fig. 5, may be used to give greater rigidity to the joint.

Figs. 1 and 7 show a modification in the mode of clamping, which is advantageously used in conjunction with the method already described, especially in building angular tanks. In this the walls A are provided with outwardly-turned flanges G, which latter are embraced by the clamps H, constructed as shown, with or without the intervening stiffening-strips I. These clamps are tightened upon the flanges G by the set-screws *c*. The bottom K is attached to the walls A A by the screw-bolts *d*, passing through said bottom and the outwardly-turned flanges M of the walls A, or preferably through the external angle-iron L. When the latter is used, it is attached to the walls A by the screw-bolts *e*.

When the tank is constructed with a closed top, the latter is preferably attached to the walls in the same manner as the bottom just described, a suitable man-hole being left in the top for communication with the interior.

In all cases in forming the joints described, a packing of rubber, paper, leather, canvas, or other suitable material is used to render the joints liquid-tight.

In attaching the bottom to the walls of the tank, the clamps H may be used, when preferred, instead of the bolts *d*.

I prefer to make the walls A of sections as long as the tank is high, because when made with cross-seams it is extremely difficult to secure a tight joint at the point of intersection of the vertical and horizontal joints.

This tank may be round, square, hexagon, octagon, or of any other suitable shape. It is preferably made, however, with as many plain vertical sides as it has plates in its periphery, the material being preferably iron or paper.

I do not claim a portable metal tank made in sections, as that is not my invention.

What I claim as new, and desire to secure by Letters Patent, is—

1. A portable tank constructed by clamping or bolting the walls A A together in the manner substantially as described.

2. The joint formed by bringing the edges of the sections A A together, as shown, and clamping or bolting them to the strip B or B', substantially as described.

3. The bolt C, provided with a head or clamp suitable for clamping the sections A A to the strip B, essentially as indicated.

4. The walls A A of the tank provided with outwardly-projecting flanges M, or angle-irons L, for the purpose of attaching the walls to the bottom K, essentially as described.

JAS. ROBINSON.

Witnesses:
J. B. GIRARD,
S. Q. BLAIR.